US006559272B1

(12) United States Patent
Jeon et al.

(10) Patent No.: US 6,559,272 B1
(45) Date of Patent: May 6, 2003

(54) METHOD FOR PREPARING COPOLYESTER RESINS USING TITANIUM DIOXIDE/ SILICON DIOXIDE COPRECIPITATE CATALYST IN THE FORM OF SUSPENSION IN GLYCOL

(75) Inventors: Jae-Young Jeon, Kyunggi-do (KR); Yoon-Hee Hong, Kyunggi-do (KR); Sung-Gi Kim, Kyunggi-do (KR)

(73) Assignee: SK Chemicals Co. Ltd., Kyunggi-do (KR)

( * ) Notice: Subject to any disclaimer, the term of this patent is extended or adjusted under 35 U.S.C. 154(b) by 0 days.

(21) Appl. No.: 10/057,386

(22) Filed: Jan. 24, 2002

(30) Foreign Application Priority Data

Oct. 12, 2001 (KR) ........................................ 2001-63073

(51) Int. Cl.$^7$ ............................................. C08G 63/78
(52) U.S. Cl. ..................... 528/279; 528/283; 528/286; 528/302; 528/307; 528/308; 528/308.6; 524/706; 524/783; 524/789
(58) Field of Search ................................ 528/279, 283, 528/286, 302, 307, 308, 308.6; 524/706, 783, 789

(56) References Cited

U.S. PATENT DOCUMENTS

| 5,681,918 A | 10/1997 | Adams et al. | 528/279 |
| 5,684,116 A | 11/1997 | Martl et al. | 528/176 |
| 5,744,571 A | 4/1998 | Hilbert et al. | 528/272 |
| 5,789,528 A | 8/1998 | Martl et al. | 528/279 |
| 5,798,433 A * | 8/1998 | Schmidt et al. | 528/279 |
| 6,342,579 B2 * | 1/2002 | Jeon et al. | 528/279 |

* cited by examiner

*Primary Examiner*—Samuel A. Acquah
(74) *Attorney, Agent, or Firm*—Abelman, Frayne & Schwab

(57) ABSTRACT

Disclosed is a method for preparing polyester resins copolymerized with glycol for modification such as 1,4-cyclohexanedimethanol, in which the content of said glycol ingredient for modification ranges from 20 to 80 mol % of the total glycol content. Dicarboxylic acid such as terephthalic acid is esterified with ethylene glycol and said glycol for modification. The esterification product is subjected to polycondensation in the presence of a titanium dioxide/ silicon dioxide coprecipitate catalyst, said catalyst being in the form of 4% or less strength by weight suspension in glycol. The copolyester prepared as above shows excellent transparency and color properties in addition to being produced at high efficiency.

7 Claims, No Drawings

METHOD FOR PREPARING COPOLYESTER RESINS USING TITANIUM DIOXIDE/ SILICON DIOXIDE COPRECIPITATE CATALYST IN THE FORM OF SUSPENSION IN GLYCOL

BACKGROUND OF THE INVENTION

1. Field of the invention

The present invention relates, in general, to a method for preparing polyester resins copolymerized with glycol for modification such as 1,4-cyclohexanedimethanol. More particularly, the present invention pertains to a method for preparing polyester resins, in which polycondensation in the presence of titanium dioxide/silicon dioxide coprecipitate in the form of a suspension in glycol as a polycondensation catalyst is carried out.

2. Description of the Prior Art

Recently, polyester resin found many important applications in packing, molding and film industries. However, polyesters consisting merely of terephthalic acid and ethylene glycol do not show good moldability. For this reason, various glycols and/or dicarboxylic acids have been employed to modify the above polyesters and such modified polyester resins are prevalent in such industries. Conventionally, these polyester resins were prepared in the presence of antiomony catalysts. However, recent research has been directed to the preparation of polyester resins in the presence of titanium catalysts, instead of parts or all antimony catalysts which are required in large quantities owing to their relatively low catalytic activity, with the aim of improving reactivity and product transparency and avoiding the gray coloration attributable to antimony catalysts.

In this regard, U.S. Pat. Nos. 5,681,918 and 5,744,571 disclose the preparation of polyester in the presence of titanium alkoxide-based catalysts. Over antinomy-based catalysts, the titanium alkoxide-based catalysts certainly have advantages in the quantity used and in reactivity. However, the high sensitivity of the titanium alkoxide-based catalysts to moisture results in undesirable problems. For example, these catalysts are difficult to store and handle because, when coming into contact with moisture, they become low in reactivity and are deposited as precipitates. In addition, the titanium alkoxide-based catalysts should be added in amounts larger than necessary because moisture is generated upon ester exchange, adversely affecting the activity of the catalysts. Further, the polyester or copolyester resins, which are prepared in the presence of the titanium-alkoxide catalysts, are not improved in color or transparency to desirable extents.

Furthermore, U.S. Pat. Nos. 5,684,116 and 5,789,528 propose titanium dioxide/silicon dioxide coprecipitates and/or titanium dioxide/zirconium dioxide coprecipitates as polycondensation catalysts for the preparation of polyesters and copolyesters. However, nowhere are there mentioned copolyester resins comprising diols in a copolymerization ratio of more than 20%, nor the possibility to achieve such resins are disclosed.

SUMMARY OF THE INVENTION

The intensive and thorough research into the preparation of polyester resin copolymerized with glycol such as 1,4-cyclohexanedimethanol, conducted by the present inventors aiming to overcome the above problems encountered in prior arts, resulted in the finding that the polycondensation of esterification products in the presence of certain titanium-based compounds brings about a significant improvement in the transparency and coloration of the final products, leading to the present invention.

Therefore, it is an object of the present invention to provide a method for preparing polyester resins copolymerized with glycol ingredient for modification such as 1,4-cyclohexanedimethanol, which have excellent transparency and color properties as well as good processability.

Based on the present invention, the above object may be accomplished by a provision of a method for preparing copolyester resins comprising the following steps of: esterifying dicarboxylic acid with ethylene glycol and other glycol for modification; and polycondensing said esterification product in the presence of a titanium dioxide/silicon dioxide coprecipitate catalyst, said catalyst being in the form of 4% or less strength by weight suspension in glycol, in which the copolyester resins have said other glycol content ranging from 20 to 80 mol % of the total glycol content.

DETAILED DESCRIPTION OF THE INVENTION

In accordance with the present invention, polyester or copolyester is prepared in a two-stage process, that is, esterification and polycondensation.

In the first stage, the esterification is carried out using dicaboxylic acid, ethylene glycol and other glycol for modification such as 1,4-cyclohexanedimethanol, where the molar ratio of total glycols (ethylene glycol+other glycol for modification) to dicarboxylic acid is within the range of 1.05:1 to 3.0:1.

The dicarboxylic acid useful in the present invention may be exemplified by terephthalic acid, isophthalic acid, 1,4-cyclohexanedicarboxylc acid, 1,3-cyclohexnaedicarboxylic acid, succinic acid, glutaric acid, adipic acid, sebasic acid, 2,6-naphthalenedicarboxylic acid or mixtures thereof.

Examples of said other glycol ingredient for modification useful in the present invention are 1,4-cyclohexanedimethaneol, 1,2-propanediol, 1,3-propanediol, 1,4-propanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol or mixtures thereof, with preference for 1,4-cyclohexanedimethanol. At this time, 1,4-cyclohexanedimethanol, representative of said other glycol, may be a cis- or a trans-isomer, or mixtures thereof.

Said other glycol ingredient is added at an amount approximated to a desired mol % of the final copolyester product. In the present invention, said other glycol content of the copolyester ranges from 20 to 80 mol % of the total glycol content so as to prevent the difficulties in polymer processing processes due to crystallization and improve other physical properties.

Additionally, multifunctional compounds such as trimellitic anhydride, trimellitic acid, trimethylolpropane, and/or pentaerythritol may be used in small quantities.

The esterification is carried out at 230 to 260° C., preferably, at 240 to 260° C., and even more preferably, at 245 to 255° C. under a pressure of 0.1 to 3.0 kg/cm². Also, the esterification generally requires 100 to 300 min to complete, depending on the reaction temperature, pressure and molar ratio of total glycols to dicarboxylic acid.

The esterification is usually carried out in the absence of catalysts, but a decrease in reaction time requires use of catalysts. In the present invention, the esterification of glycols and dicarboxylic acid may be conducted in a batch or a continuous manner. The materials may be separately fed, but it is most preferable to feed the materials together in a slurry form.

Following the completion of the esterification reaction, the polycondensation is conducted. In advance of the second stage, a polycondensation catalyst is added, along with a stabilizer and optionally a color toning agent, to the esterification product.

For use in polycondensation, catalysts are conventionally selected from titanium, germanium and antimony compounds. Among these, the titanium-based catalyst is the most advantageous since it is used at a smaller amount than the antimony-based catalyst and is less expensive than the germanium-based catalyst.

Examples of generally usable titanium-based catalyst include tetraethyl titanate, acetyltripropyl titanate, tetrapropyl titanate, tetrabutyl titanate, polybutyl titanate, 2-ethylhexyltitanate, octyleneglycol titanate, lactate titanate, triethanolamine titanate, acetylacetonate titanate, ethylacetoacetic ester titanate, isostearyl titanate, titanium dioxide, titanium dioxide/silicon dioxide coprecipitates, and titanium dioxide/zirconium dioxide coprecipitates. In the present invention, titanium dioxide/silicon dioxide coprecipitates are employed because they are easy to store and handle because of their insensitivity to moisture, as well as bringing about an improvement in color and transparency. In accordance with the present invention, titanium dioxide/silicon dioxide coprecipitates are added in the form of 4% or less strength by weight suspension in glycol. When being used in the form of more than 4% strength by weight suspension in glycol, the catalyst may be not dissolved completely, adversely affecting the polymerization rate or the color and transparency of the final copolyester.

As for the amount of catalyst, it has influence on the color of the final polymer and thus may vary depending on the desired colors and additives used, such as stabilizers and color toning agents. In accordance with the present invention, the catalyst is used in the amount of 1 to 100 ppm of titanium element based on the weight of the final polymer, and preferably in the amount of 1 to 50 ppm of titanium element and in the amount of 10 ppm or less of silicon element. For example, if less than 1 ppm of titanium element is used, the polymerization degree cannot reach a desired value. On the other hand, more than 100 ppm of titanium element causes the final polymer to yellow. Also, in the presence of more than 10 ppm of silicon element, the polycondensation is more slowly conducted.

For the preparation of the copolyester of the present invention, additives may be used. Usually used are stabilizers and color toning agents. As stabilizers employable in the present invention, phosphorus compounds may be used, the illustrative, but non-limiting examples of which include phosphoric acid, trimethyl phosphate and triethyl phosphate. Such a stabilizer is added in the amount of 10 to 100 ppm of a phosphorus element based on the weight of the final polymer. For example, when the amount of the stabilizer is below 10 ppm, its effect is too small to prevent yellowing of the final polymer. On the other hand, in the presence of more than 100 ppm of the stabilizer, the final polymer does not have the desired polymerization degree.

To better coloration of the final polymer, color toning agents, exemplified typically by cobalt acetate and cobalt propionate, may be added in the amount of 0 to 100 ppm, based on the weight of the final polymer. In addition, conventional organic compounds well known as color toning agents may be used.

In the second stage, the polycondensation of the esterification product is carried out for the time period necessary for the final polymer to reach a desired intrinsic viscosity. At this time, the reaction temperature ranges from 250 to 290° C. The polycondensation is also conducted under a reduced pressure of 400 to 0.1 mmHg so as to remove the by-product glycol.

A better understanding of the present invention may be obtained in light of the following examples which are set forth to illustrate, but are not to be construed to limit the present invention. In the following examples, the unit "parts" refers to "parts by weight" unless otherwise stated. Physical properties of the final polymers were measured as follows.

Intrinsic viscosity (IV): a product was dissolved in orthochlorophenol to the final concentration of 0.12% at 150° C. and then its intrinsic viscosity was measured with a Ubbelohde typed viscometer in a thermostat maintained at 35° C.

Color: a product was analyzed for color by use of the Colorgard System, manufactured by Pacific Scientific.

EXAMPLE 1

Into a 3 liter reactor equipped with a stirrer and a discharge condenser, 996 parts of terephthalic acid, 294 parts of 1,4-cyclohexanedimethanol, and 618 parts of ethylene glycol were placed, followed by charging nitrogen until the inside pressure of the reactor reached 2.0 kg/cm². The reactor temperature was slowly increased to 255° C. where the esterification reaction was conducted while the water vapor generated was distilled off through the discharge condenser.

Following the completion of water generation and discharge, the esterification product was transferred into a polycondensation reactor equipped with a stirrer, a cooling condenser and a vacuum system. To the esterification products, a titanium dioxide/silicon dioxide coprecipitate in the form of 2% strength by weight suspension in ethylene glycol was added in the amount of 20 ppm of a titanium element and in the amount of 1.3 ppm of a silicon element, based on the weight of the final polymer. Also, the esterification product was added with triethylphosphate and cobalt acetate. These compounds were used in amounts of 30 ppm of a phosphorus element and 60 ppm of a cobalt element, respectively, based on the weight of the final polymer.

While the reactor temperature was increased from 240 to 275° C., the pressure of the reactor was reduced from atmospheric pressure to 50 mmHg at which the ethylene glycol was removed or 40 min, and then slowly to 0.1 mmHg at which the polycondensation reaction was carried out until the polymer had the desired intrinsic viscosity. After being discharged from the reactor, the 1,4-cyclohexanedimethanol-copolymerized polyester resin thus obtained was cut into pellets and measured for intrinsic viscosity and color according to the above-mentioned methods. The results are summarized in Table 1, below.

COMPARATIVE EXAMPLES 1 AND 2

The procedure of Example 1 was repeated, with the exception that the kind and formulation concentration of the polycondensation catalyst were changed as shown in Table 1, below. Measurements were made of the intrinsic viscosity and color of the polyester copolymerized with 1,4-cyclohexane and the results are given in Table 1, below.

TABLE 1

| Example No. | Cat. Formulation | | I. V. (dL/g) | Polycon- densation Time (min) | Color-b (Yellow- ness) |
|---|---|---|---|---|---|
| | *Catalyst | Conc. (%) | | | |
| 1 | Cat.-1 | 2.0 | 0.780 | 140 | 3.4 |
| C. 1 | Cat.-2 | 5.0 | 0.782 | 170 | 6.1 |
| C. 2 | Cat.-3 | 5.0 | 0.781 | 195 | 7.3 |

*Cat.-1: titanium dioxide/silicon dioxide coprecipitate
Cat.-2: tetrapropyl titanate
Cat.-3: tetrabutyl titanate

EXAMPLE 2

Into a 1 liter reactor equipped with a stirrer and a discharge condenser, 199.2 parts of terephthalic acid, 58.8 parts of 1,4-cyclohexanedimethanol, and 123.5 parts of ethylene glycol were placed, followed by charging nitrogen until the inside pressure of the reactor reached 1.0 kg/cm². The reactor temperature was slowly increased to 255° C. where the esterification reaction was conducted while the water a vapor generated was distilled off through the discharge condenser.

Following the completion of water generation and discharge, the esterification product was transferred into a polycondensation reactor equipped with a stirrer, a cooling condenser and a vacuum system. To the esterification products, a titanium dioxide/silicon dioxide coprecipitate in the form of 1% strength by weight suspension in ethylene glycol was added in the amount of 20 ppm of a titanium element and in the amount of 1.3 ppm of a silicon element, based on the weight of the final polymer. Also, the esterification product was added with phosphoric acid and cobalt acetate. These compounds were used in amounts of 30 ppm of a phosphorus element and 60 ppm of a cobalt element, respectively, based on the weight of the final polymer. While the reactor temperature was increased from 240 to 275° C., the pressure of the reactor was reduced from atmospheric pressure to 50 mmHg at which the ethylene glycol was removed for 40 min, and then slowly to 0.1 mmHg at which the polycondensation reaction was carried out until the polymer had the desired intrinsic viscosity. After being discharged from the reactor, the 1,4-cyclohexanedimethanol-copolymerized polyester thus obtained was cut into pellets and measured for intrinsic viscosity and color according to the above-mentioned methods. The results are summarized in Table 2, below.

COMPARATIVE EXAMPLES 3 AND 4

The procedure of Example 2 was repeated, with the exception that the kind and formulation concentration of the polycondensation catalyst were changed as shown in Table 2, below. Measurements were made of the intrinsic viscosity and color of the polyester copolymerized with 1,4-cyclohexane and the results are given in Table 2, below.

TABLE 2

| Example No. | Cat. Formulation | | I. V. (dL/g) | Polycon- densation Time (min) | Color-b (Yellow- ness) |
|---|---|---|---|---|---|
| | *Catalyst | Conc. (%) | | | |
| 2 | Cat.-1 | 1.0 | 0.790 | 125 | 2.1 |
| C. 3 | Cat.-2 | 5.0 | 0.785 | 160 | 5.5 |
| C. 4 | Cat.-3 | 5.0 | C.787 | 175 | 6.2 |

*Cat.-1: titanium dioxide/silicon dioxide coprecipitate
Cat.-2: tetrapropyl titanate
Cat.-3: tetrabutyl titanate

EXAMPLE 3

Into a 1 liter reactor equipped with a stirrer and a discharge condenser, 199.2 parts of terephthalic acid, 58.8 parts of 1,4-cyclohexanedimethanol, and 123.5 parts of ethylene glycol were placed, followed by charging nitrogen until the inside pressure of the reactor reached 1.0 kg/cm². The reactor temperature was slowly increased to 255° C. where the esterification reaction was conducted while the water vapor generated was distilled off through the discharge condenser.

Following the completion of water generation and discharging, the esterification product was transferred into a polycondensation reactor equipped with a stirrer, a cooling condenser and a vacuum system. To the esterification products, a titanium dioxide/silicon dioxide coprecipitate in the form of 1% strength by weight suspension in ethylene glycol was added in the amount of 30 ppm of a titanium element and in the amount of 2 ppm of a silicon element, based on the weight of the final polymer. Also, the esterification product was added with phosphoric acid and cobalt acetate. These compounds were used in, mounts of 50 ppm of a phosphorus element and 80 ppm of a cobalt element, respectively, based on the weight of the final polymer. While the reactor temperature was increased from 240 to 270° C., the pressure of the reactor was reduced from atmospheric pressure to 50 mmHg at which the ethylene glycol was removed for 40 min, and then slowly to 0.1 mmHg at which the polycondensation reaction was carried out until the polymer had the desired intrinsic viscosity. After being discharged from the reactor, the 1,4-cyclohexanedimethanol-copolymerized polyester thus obtained was cut into pellets and measured for intrinsic viscosity and color according to the above-mentioned methods. The results are summarized in Table 3, below.

COMPARATIVE EXAMPLES 5 AND 6

The procedure of Example 3 was repeated, with the exception that the kind and formulation concentration of the polycondensation catalyst were changed as shown in Table 3, below. Measurements were made of the intrinsic viscosity and color of the polyester copolymerized with 1,4-cyclohexane and the results are given in Table 3, below.

TABLE 3

| Example No. | Cat. Formulation | | I. V. (dL/g) | Polycondensation Time (min) | Color-b (Yellowness) |
|---|---|---|---|---|---|
| | Catalyst | Conc. (%) | | | |
| 3 | Cat.-1 | 1.0 | 0.785 | 105 | 1.3 |
| C. 5 | Cat.-2 | 5.0 | 0.780 | 150 | 4.8 |
| C. 6 | Cat.-3 | 5.0 | 0.781 | 160 | 5.7 |

*Cat.-1: titanium dioxide/silicon dioxide coprecipitate
Cat.-2: tetrapropyl titanate
Cat.-3: tetrabutyl titanate

EXAMPLE 4

The procedure of Example 2 was repeated with the modification that the polycondensation catalyst was used in the form of 0.1% strength by weight suspension in ethylene glycol. The 1,4-cyclohexane-copolymerized polyester thus obtained was measured for intrinsic viscosity and color and the results are given in Table 4, below.

COMPARATIVE EXAMPLE 7

The procedure of Example 2 was repeated with the modification that the polycondensation catalyst was used in the form of 5% strength by weight suspension in ethylene glycol. The 1,4-cyclohexane-copolymerized polyester thus obtained was measured for intrinsic viscosity and color and the results are given in Table 4, below.

TABLE 4

| Example No. | Catalyst Formulation Conc. (%) | I. V. (dL/g) | Polycondensation Time (min) | Color-b (Yellowness) |
|---|---|---|---|---|
| 4 | 0.1 | 0.785 | 90 | 1.0 |
| C. 7 | 5.0 | 0.781 | 150 | 3.9 |

Taken together, the results obtained in the Examples and Comparative Examples demonstrates that the polyester copolymerized with 1,4-cyclohexanedimethanol of the present invention, which is prepared in the presence of a titanium dioxide/silicon dioxide coprecipitate under the stabilizing control of a phosphorous compound, is superior to conventional ones in various aspects, including intrinsic viscosity, color and productivity.

Characterized in that the titanium dioxide/silicon dioxide coprecipitate is used in a form of 4% or less strength by weight suspension in glycol so that it is completely dissolved during polymerization, the method of the present invention enjoys the advantage of increasing the polymerization rate and bringing about an improvement in the color and transparency of the copolyester. The catalyst of the present invention, even if in the same amount as that of conventional titanium alkoxide based catalyst, can improve the color property more than conventional ones. When using the catalyst of the present invention at smaller amounts than conventional catalysts, the metal content of the final polymer is reduced, thereby improving transparency.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing copolyester resins comprising the following steps of:

esterifying dicarboxylic acid with ethylene glycol and other glycol for modification; and polycondensing said esterification product in the presence of a titanium dioxide/silicon dioxide coprecipitate catalyst, said catalyst being in the form of 4% or less strength by weight suspension in glycol, in which the copolyester resins have said other glycol content ranging from 20 to 80 mol % of the total glycol content.

2. The method as set forth in claim 1, wherein said polycondensation catalyst is used in an amount of 1 to 100 ppm of the titanium element and in an amount of 10 ppm or less of the silicon element, based on the weight of the final polymer.

3. The method as set forth in claim 1, wherein the polycondensation is carried out using a phosphorous compound as a stabilizer.

4. The method as set forth in claim 3, wherein the stabilizer is used in an amount of 10 to 100 ppm of the phosphorous element based on the weight of the final polymer.

5. The method as set forth in claim 1, wherein said other glycol is 1,4-cyclohexanedimethaneol, 1,2-propanediol, 1,3-propanediol, 1,4-propanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol or mixtures thereof.

6. The method as set forth in claim 5, wherein said other glycol is 1,4-cyclohexanedimethanol.

7. The method as set forth in claim 1, wherein said dicarboxylic acid is terephthalic acid, isophthalic acid, 1,4-cyclohexanedicarboxylc acid, 1,3-cyclohexnaedicarboxylic acid, succinic acid, glutaric acid, adipic acid, sebasic acid, 2,6-naphthalenedicarboxylic acid or mixtures thereof.

* * * * *